April 10, 1956     A. L. FISHER ET AL     2,741,484

LEVELING DEVICE FOR GRAIN COMBINES

Filed Nov. 17, 1954     2 Sheets-Sheet 1

INVENTORS
ARTHUR L. FISHER
AND
AUSTIN W. FISHER
BY *Archworth Martin*
ATTORNEY

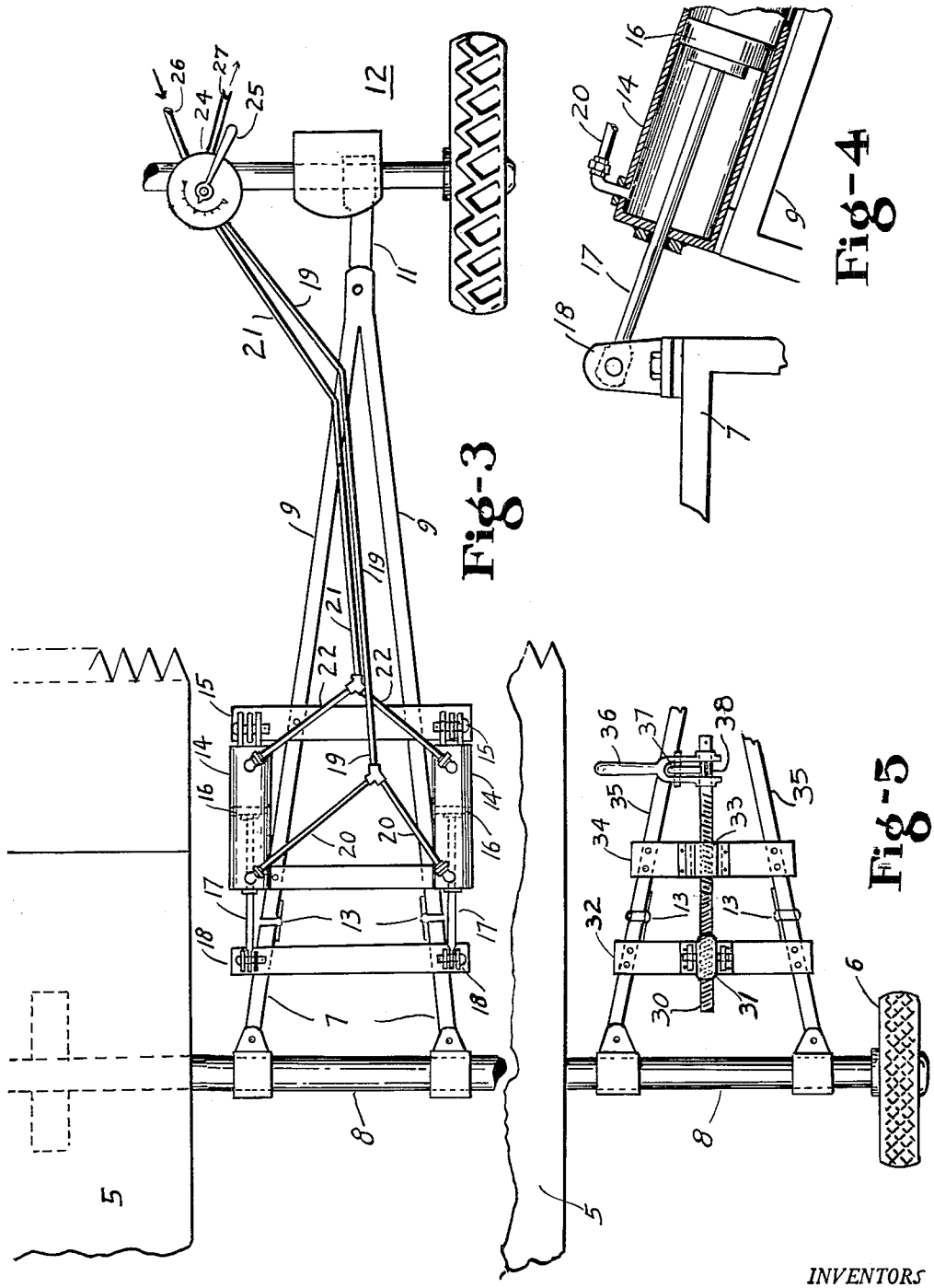

2,741,484
LEVELING DEVICE FOR GRAIN COMBINES
Arthur L. Fisher and Austin W. Fisher, Butler, Pa.
Application November 17, 1954, Serial No. 469,424
5 Claims. (Cl. 280—6)

Our invention relates to leveling devices for harvester machines such as combines, and has for its object the provision of means for adjusting the body of the combine so that it will occupy a horizontal position when the combine is being pulled uphill or downhill by the tractor, to thereby prevent spilling out of threshed grain when the combine is being drawn uphill by a tractor in a grain field, and to effect better cleaning of the chaff from the grain when moving downhill, thereby overcoming the objection to the use of present forms of combines in hilly country where the directions of travel may be uphill and downhill in a grain field.

As shown in the accompanying drawings, Figure 1 is a view showing the positions of the leveling apparatus when the body of the combine or harvester is held at a horizontal position during movement of the machine up a hill;

Fig. 3 is a plan view of the structure of Figs. 1 and 2;

Fig. 4 is an enlarged sectional view of a portion of the piston and cylinder apparatus of Figs. 1 and 2, and Fig. 5 shows a modification of the leveling apparatus of Fig. 3.

A combine or harvester machine body is represented by the numeral 5, the same being mounted on wheels 6 and having a forwardly-projecting framework 7, secured to the body of the machine and to its axle 8.

Figure 1:
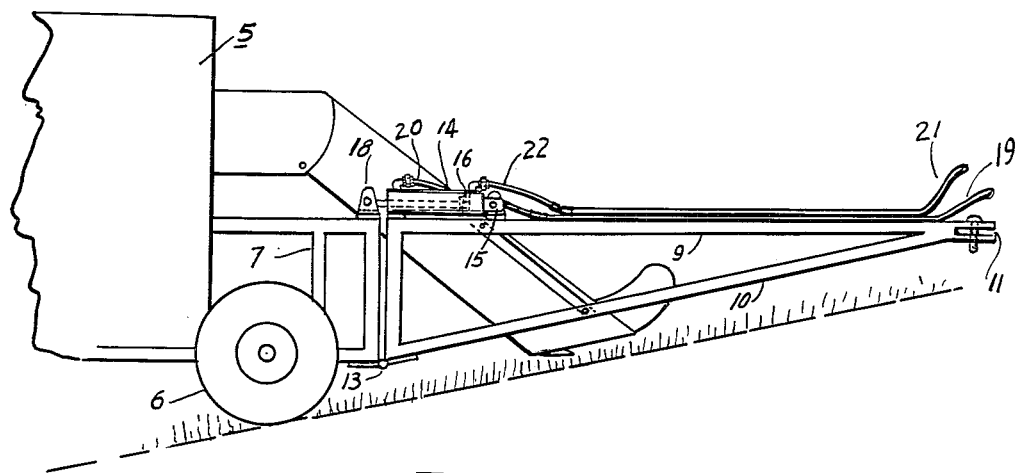
Figure 2:
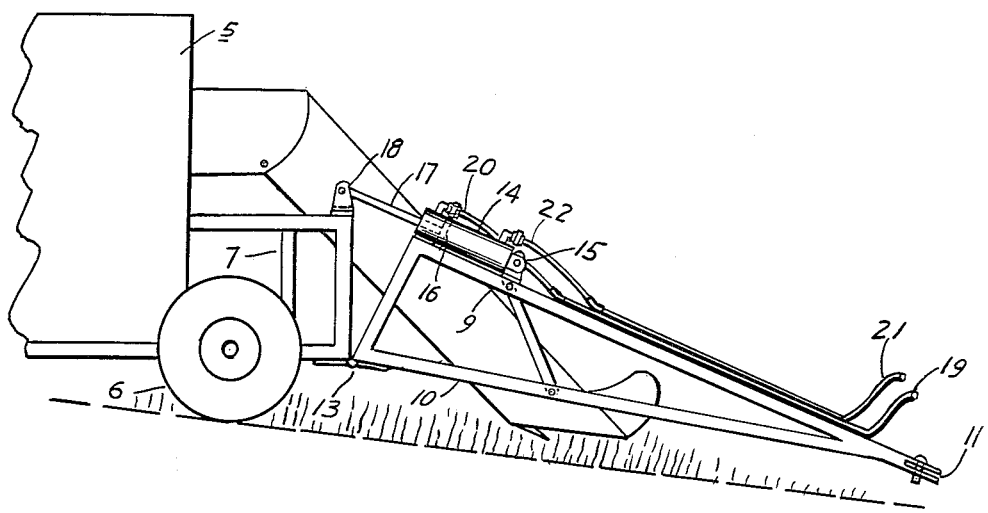
Fig. 2 shows the positions of the parts, when the combine is being worked downwardly along a slope.

A towing frame comprises upper and lower members 9 and 10 that are connected to a hitch 11 of a towing tractor 12. The lower portion of the towing frame is hingedly connected at 13 to the combine frame 7. As shown in Figs. 1 to 3, two operating cylinders 14 are provided for tilting the combine body on its axle 8 and relative to the towing frame 9–10. Each cylinder is pivotally connected at 15 to the towing frame, and its piston 16, through its rod 17, is pivotally connected at 18 to the frame 7.

Hydraulic pressure is admitted into the rear ends of the cylinders through a pipe 19 that has branches 20 and into the front ends of the cylinders through a pipe 21 that has branches 22. When pressure is admitted to the rear ends of the cylinders, the combine 5 will be tilted in a clockwise direction, toward the position shown in Fig. 1, when the machine is to be moved up a hill. Contrariwise, if the machine is moving downhill, pressure will be admitted to the front ends of the cylinders to move their pistons backwardly and thus tilt the combine in a counter-clockwise direction, until it occupies approximately a horizontal plane as in Fig. 2. For traveling along level ground, the pistons will be moved in the cylinders to their intermediate positions as in Fig. 3.

Control of fluid pressure into the cylinders and exhaust therefrom is effected by a valve 24 that has an operating handle 25, oil under pressure from a suitable source being supplied through a pipe 26. The valve may be of conventional form, wherein, at one position, it will establish communication between the inlet 26 and the line 19, for example, with return at 27 to a hydraulic pump. At its opposite position, the valve will direct pressure through the pipe 21, with exhaust from the opposite ends of the cylinders. At an intermediate position of the handle, the oil will be locked in the cylinders to hold the parts in a given position.

Referring to Fig. 5, I show an arrangement whereby the combine frame 7 is tiltably adjusted by a screw 30 which has a thread engaging in a swivel nut 31 that is pivotally mounted on a cross bar 32 of the frame 7, and having a reversely-threaded portion in engagement with a nut 33 that is mounted on a cross bar 34 which is secured to the towing members 35 that correspond to the member 9 of Fig. 3. The adjusting screw 30 has a lever 36 pivotally carried thereby and serving for operation of a double acting pawl 37 that will engage teeth 38 on the screw, for turning the screw shaft in either direction.

Two screws can be used if desired, instead of the two cylinders of Fig. 3, and also a single cylinder can be employed instead of the single screw of Fig. 5.

The screw 30 can, of course, be operated by mechanical power instead of manually, in any suitable manner, by a hydraulic motor or an electric motor on the tractor, with reversible driving means.

We claim as our invention:
1. The combination with a tractor and a harvesting machine that is supported by wheels and is tiltable on an axis parallel to the axis of the wheels, of framework on the forward end of the machine and including vertically-extending members, a towing frame having upper and lower frame members at its rear end, means connecting the forward end of the towing frame to a tractor hitch, a hinge connection between the lower portions of the said vertically-extending members and the lower frame members of the towing frame, members respectively connected to the upper portions of the said framework and the towing frame, and an element connected to said members and operable to move them toward and from each other and thereby rock the two frames relative to each other, about the said hinge as a pivot.

2. The combination with a harvesting machine that is supported at its forward end by an axle and wheels, and a tractor, of vertical framework carried at its lower end by the axle and having its upper end secured to the machine at a substantial distance above the axle, and extending forwardly therefrom, a towing frame with means for connecting its forward end to the tractor and having upper and lower members at its rear end, a hinge connection between the lower portion of said vertical framework and the lower members of the towing frame, connecting members respectively carried by the upper end of the vertical framework and the upper members of the towing frame, and elements connected to said connecting members and operable to move the connecting members toward and from each other, to thereby rock the two frames relative to each other and tilt the machine on the axis of its wheels.

3. A structure as recited in claim 2, wherein the vertical framework is connected to the axle at substantial distances apart along the axis thereof, and a cross bar is secured at its ends to the upper part of the framework, and said operating elements are connected to the cross bar.

4. A structure as recited in claim 3, wherein the operating elements comprise pistons and cylinders respectively connected to the towing frame and each end of the cross bar.

5. A structure as recited in claim 2, wherein the vertical framework is connected to the axle at substantial distances apart along the axis thereof, and a cross bar is secured at its ends to the upper part of the framework, and said operating elements comprise nuts respectively carried by the towing frame and the middle of the cross bar and a screw shaft threaded into the nuts that are reversely threaded relative to each other.

References Cited in the file of this patent
UNITED STATES PATENTS

| | | |
|---|---|---|
| 2,354,962 | Oehler et al. | Aug. 1, 1944 |
| 2,458,666 | Williams | Jan. 11, 1949 |
| 2,504,289 | Waterman | Apr. 18, 1950 |